Sept. 14, 1937. J. H. HICKEY Re. 20,501

REFILLABLE FUSE

Original Filed July 7, 1928

INVENTOR.
JOHN H. HICKEY
By Arthur R. Slee.
ATTY.

Reissued Sept. 14, 1937

Re. 20,501

UNITED STATES PATENT OFFICE 20,501

REFILLABLE FUSE

John H. Hickey, San Francisco, Calif., assignor to Hickey Fuse & Manufacturing Company, San Francisco, Calif., a corporation of California Original No. 1,794,710, dated March 3, 1931, Serial No. 291,039, July 7, 1928. Application for reissue August 15, 1932, Serial No. 628,912

37 Claims. (Cl. 200—132)

My invention relates to improvements in refillable fuses wherein a fusible element is mounted within a casing between terminal members detachably secured upon the ends of said casing and provided with improved means for alining the terminals and clamping said members in sealing relation to the ends of the casing.

The primary object of my present invention is to provide a refillable fuse of simplified and improved construction.

Another object is to provide an improved fuse wherein the terminals are readily removable to receive a new fusible element and which will facilitate the reassembly of the fuse.

A further object is to provide an improved construction which will effectually seal the ends of the fuse casing.

Another object is to provide an improved device which is simple and positive in its action and which will permit the fuse to be refilled repeatedly.

A still further object is to provide an improved construction which can be manufactured economically and which is durable and efficient in service.

I accomplish these and other objects by means of the improved device disclosed in the drawing forming a part of the present application wherein like characters of reference are used to designate similar parts throughout the specification and drawing and in which—

Figure 1:
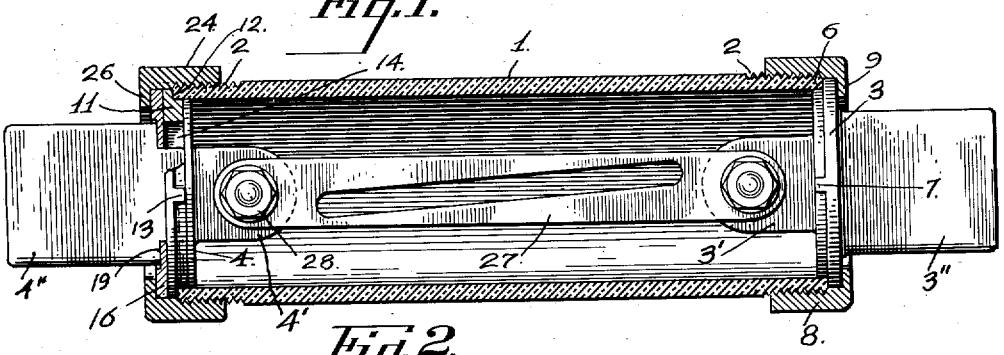
Fig. 1 is a longitudinal section of my improved refillable fuse.
Figure 2:
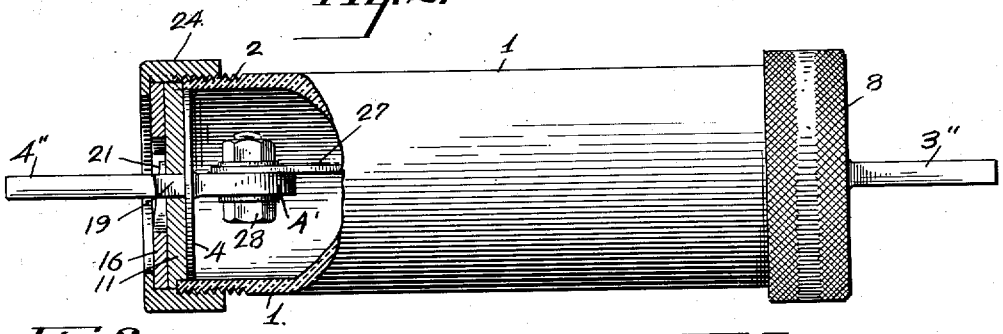
Fig. 2 is a side elevation, partly in longitudinal section of the fuse, the view being shown in a position at right angles to the position shown in Fig. 1.
Figure 3:
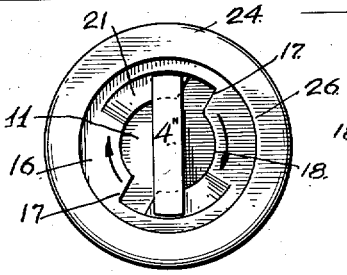
Fig. 3 is an end elevation of the fuse.
Figure 4:
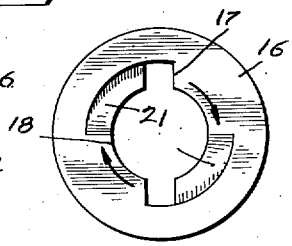
Fig. 4 is a plan view of the clamping member.
Figure 5:
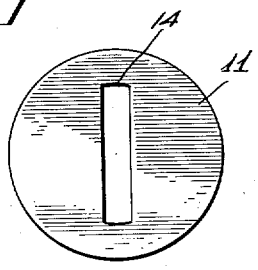
Fig. 5 is a plan view of the closure.
Figure 6:
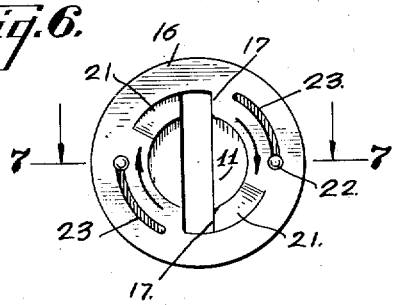
Fig. 6 is a plan view of a modified form wherein the clamping plate is secured to the closure.
Figure 7:
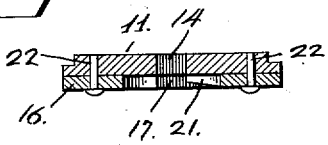
Fig. 7 is a transverse section of the modified form, taken upon the line 7—7 of Fig. 6 in the direction indicated.

Referring to the drawing, the numeral 1 is used to designate a cylindrical casing threaded at both ends, as at 2. Terminal members 3 and 4 are mounted within the ends of the casing, said terminals consisting of annular flange portions having inwardly extending lugs 3′ and 4′ and outwardly extending blade portions 3″ and 4″ respectively.

The terminal member 3 is provided with an annular shoulder 6 arranged to seat upon the end of the casing 1. A lug 7 is formed upon the shoulder to engage a recess formed in the end of the casing to define the normal operative position of the terminal. A collar 8 is threaded onto the end of the casing 1 and provided with an inwardly disposed flange 9 arranged to seat against the terminal 3 to hold the terminal member seated in sealing relation to the end of the casing.

The terminal member 4 is movable through the casing 1, the flange portion being received within the end of the casing. A closure 11 having an annular shoulder 12 is arranged to seat upon the end of the casing 1 adjacent the terminal 4, a lug 13 being formed upon the shoulder 12 to engage a recess formed upon the end of the casing to aline the terminal in respect to the opposite terminal 3. The closure 11 is provided with a slot 14 arranged to slidably receive the outwardly extending blade 4″ whereby the closure 11 may be moved into proximate relation to the flange portion of the terminal 4.

A clamping member 16 having a slot 17 arranged to slidably engage the blade 4″ is mounted in proximate relation to the closure 11. Arcuate recesses 18 are formed in the center of the member 16 to permit the member 16 to be rotated upon a reduced portion of the blade 4″ formed by notches 19 formed in the sides of said blade portion. Inclined surfaces 21 are formed upon the outer side of the member 16 to be received within the notches 19, the outer sides of the notches being inclined to correspond to the surfaces 21. The member 16 may fit loosely onto the outer end of the terminal 4 and against the closure 11, or if desired, pins 22 may be arranged to extend through arcuate slots 23 formed in the member 16, said pins being secured upon the closure 11 and being provided with heads arranged to engage the outer surface of the member 16 whereby the clamping member may be held in engagement with the closure 11 so that the two members may be applied and removed together.

A collar 24 is threaded onto the end of the casing 1 and provided with an inwardly disposed flange 26 arranged to seat upon the outer edge of the member 16 whereby the member 16 may be held firmly seated upon the closure 11 and said closure 11 in turn held firmly seated upon the end of the casing.

A suitable fusible element 27 is secured between the inwardly extending lugs 3′ and 4′ by suitable securing members 28 in the well known manner.

In operation, the fuse is assembled by securing the fusible element 27 between the lugs 3′ and 4′ and then inserting the terminal 4 and the fusible element through the casing until the terminal 3 is seated upon the end of the casing. The collar 8 is threaded onto the end of the casing to clamp the terminal firmly against the end of the casing, the collar being tightened to effectually seal the end of the casing and prevent the escape of gas around the ends of the terminal. The lug 7 defines the position of the terminal relative to the end of the casing.

After the collar 8 has been applied, the closure 11 is moved onto the outwardly extending blade portion of the terminal 4 and is seated upon the adjacent end of the casing 1, the lug 13 being moved to engage its recess in the end of the casing to aline the terminal 4 with respect to the opposite terminal 3. The clamping member 16, which may be either applied separately or linked to the closure 11 by the pins 22 as above described, is turned to cause the inclined surfaces 21 to enter the notches 19 in interlocking engagement with the terminal blade. As the clamping member 16 is turned, the inclined surfaces act as wedges operating to press the closure 11 and the terminal 4 tightly together. The collar 24 is tightened to press the closure 11 against the end of the casing. The member 16 may be moved manually, or by the frictional contact of the flange 26 against the outer face of the member 16 as the collar is turned on the casing end. The clamping member 16 insures a close contact between the closure 11 and the adjacent surfaces of the terminal 4 and the member 16, and locks the terminal member 4 against movement axially of the casing, and the collar 24 effectually secures and seals the closure across the end of the casing.

As thus assembled, the fuse is used in the ordinary manner. When the fusible element 27 is to be replaced, the fuse is taken apart by removing the collars 8 and 24, and a new fusible element applied as above described and the fuse reassembled for further use. The clamping member insures a gas-tight closure, and, being positioned upon the outer side of the terminal and closure, is unaffected by gases or metal projected from the fusible element when blown.

The specific details of construction may of course be modified in numerous ways without departing from the spirit of my invention, and I therefore desire to avail myself of all modifications which may fall within the scope of the appended claims.

Having thus described my invention what I claim as new and desire to secure by Letters Patent is—

1. A refillable fuse comprising a casing; terminal members arranged to engage the ends of the casing; a fusible element connected between the terminal members; a collar detachably securing one of the terminal members upon the casing; clamping means detachably clamped upon the opposite terminal member and seating upon the adjacent end of the casing; and a collar detachably securing the clamping means upon the end of the casing.

2. A refillable fuse comprising a casing; terminal members arranged to engage the ends of the casing; a fusible element connected between the terminal members; a collar detachably securing one of the terminal members upon the casing; a closure engaging the opposite terminal member and seating upon the adjacent end of the casing; clamping means rotatably mounted in proximate relation to the closure and having means for detachably clamping said closure in engagement with the terminal member; and a collar detachably securing the closure and clamping means upon the end of the casing.

3. A refillable fuse comprising a casing; terminal members arranged to engage the ends of the casing; a fusible element connected between the terminal members; a collar detachably securing one of the terminal members upon the casing; a closure engaging the opposite terminal member and the adjacent end of the casing; a clamping member mounted in engagement with the closure and rotatably movable relative thereto to engage notches formed in the terminal member for clamping the terminal and the closure together; and a collar engaging the end of the casing and detachably securing the closure and clamping member upon the end of said casing.

4. A refillable fuse comprising a casing; terminal members arranged to engage the ends of the casing; a fusible element connected between the terminal members; a cap detachably securing one of the terminal members upon the casing; a closure engaging the opposite terminal member and the adjacent end of the casing; a clamping member mounted in engagement with the closure and provided with inclined surfaces arranged to engage notches formed in the terminal member to clamp the terminal and closure together; and a collar engaging the end of the casing and detachably securing the terminal and closure upon the end of the casing.

5. A refillable fuse comprising a casing; terminal members arranged to engage the ends of the casing; a fusible element connected between the terminal members; a collar detachably securing one of the terminal members upon the casing; a closure slotted to engage the opposite terminal and arranged to seat upon said terminal and the adjacent end of the casing; a clamping plate mounted in proximate relation to the closure and rotatably movable relative thereto, said clamping plate having inclined surfaces arranged to engage notches formed in the terminal to clamp the terminal and closure together; and a collar engaging the end of the casing and detachably securing the terminal and closure upon the end of the casing.

6. A refillable fuse comprising a casing; terminal members arranged to engage the ends of the casing, said members each comprising an annular flange having inwardly extending lugs and outwardly extending blade portions; a fusible element connected between the inwardly extending lugs; a collar detachably securing the flange portion of one terminal member against one end of the casing; a closure slotted to fit over the blade of the opposite terminal member and arranged to seat upon the adjacent end of the casing; clamping means rotatably mounted in connection with the closure and movable to clamp said closure and the terminal flange together; and a collar detachably securing the closure and clamping means against the end of the casing.

7. A refillable fuse comprising a casing; terminal members arranged to engage the ends of the casing, said members each comprising an annular flange portion having inwardly extending lugs and outwardly extending blade portions; a fusible element connected between the inwardly extending lugs; a collar detachably securing the flange portion of one terminal member seated against one end of the casing; a closure slotted to fit over the blade of the opposite terminal and arranged to seat upon the adjacent end of the casing; a clamping plate rotatably mounted upon said blade in proximate relation to the closure, said clamping plate having inclined surfaces arranged to engage notches formed in the blade for clamping the terminal member and the closure together; and a collar detachably securing the closure seated against the adjacent end of the casing.

8. In a refillable fuse having a casing and terminal members detachably secured upon the ends of said casing, a closure arranged to seat upon one end of the casing, said closure being slotted to receive a terminal member; and a clamping plate mounted in proximate relation to the closure, said clamping plate being rotatably movable relative to the terminal member and closure and having inclined surfaces arranged to engage notches formed in the terminal member for detachably clamping the terminal member and the closure together.

9. In a refillable fuse having a casing and terminal members detachably secured upon the ends of said casing, a closure arranged to detachably engage a terminal member and to seat upon one end of the casing; and a clamping plate rotatably mounted upon the terminal member in proximate relation to the closure and provided with inclined surfaces engaging notches formed in the terminal member for clamping the terminal member and closure together.

10. In a refillable fuse having a casing, a terminal member having a flange fitted within an end of the casing; a closure seated upon the end of the casing, said closure being slotted to slidably engage the terminal member; and a clamping member mounted in proximate relation to the outer surface of the closure, said clamping member being rotatably movable relative to the closure and terminal member and having means movable into clamping engagement with notches formed in said terminal member to clamp said member and the closure together.

11. In a refillable fuse having a casing, a terminal member having a flange fitted within an end of the casing; a closure seated upon the end of the casing, said closure being slotted to slidably engage the terminal member; and a clamping member mounted upon the terminal member in proximate relation to the outer surface of the closure, said clamping member being rotatably movable and having inclined surfaces arranged to engage notches formed in the terminal member to clamp said member and the closure together.

12. In a refillable fuse having a casing, terminal members mounted within the ends of the casing, one of said members being arranged to seat upon the end of the casing and having a lug engaging a recess in the end of the casing to aline the member; a closure slidably engaging the opposite terminal and arranged to seat upon the adjacent end of the casing, said closure having a slot arranged to receive the outer end of the terminal member and having a lug arranged to engage a recess formed in the end of the casing to aline said closure and terminal with the opposite terminal; and a clamping plate slidably and rotatably engaging the outer end of the terminal member and provided with inclined surfaces arranged to engage notches formed in said terminal member adjacent the closure for clamping said closure and the terminal member together.

13. In a renewable fuse, the combination of a tubular fuse body, a terminal blade arranged to extend through the end of said body, an abutment on said terminal blade extending outwardly from the sides of the blade, the blade being provided with a restricted neck outside of said abutment, a slotted washer arranged to be slipped down over the terminal blade to rest against the abutment and close the end of the fuse body, a sealing disk having a central aperture enlarged at diametrically opposite points to permit the disk when turned into one position to be slipped down over the blade and rest on the washer, said disk being then rotated relative to the washer to clasp the restricted neck of the blade, and seal the ends of the slot of the washer, and means separate from the sealing washer for clamping the disk against the washer and the washer against the end of the fuse body.

14. In a renewable fuse, the combination of a tubular fuse body, a terminal blade arranged to extend through the end of said body, an abutment on said terminal blade extending outwardly from the sides of the blade, the blade being provided with a restricted neck outside of said abutment, a slotted washer arranged to be slipped down over the terminal blade to rest against the abutment and close the end of the fuse body, a sealing disk having a central aperture enlarged at diametrically opposite points to permit the disk when turned into one position to be slipped down over the blade and rest on the washer, said disk being then rotated relative to the washer to clasp the restricted neck of the blade and seal the ends of the slot of the washer, and an annular cap arranged to be screwed on the end of the fuse body to clamp the disk to the washer and the washer to the end of the fuse body.

15. In a fuse, a casing, an end cap applicable thereto by movement longitudinally of the casing, a fuse strip assembly insertable in the casing and having a portion projecting through said cap, and a lock member interengageable with said fuse strip assembly to prevent longitudinal movement thereof relative to the casing, said lock member being operable by movement of said cap longitudinally of the casing.

16. In a fuse, a casing, an end cap applicable thereto by movement longitudinally of the casing, a fuse strip assembly insertable in the casing and having a portion projecting through said cap, and means interengageable with said fuse strip assembly for locking the same against movement longitudinally in the casing, said means being operable to locking position by movement of the cap in one direction longitudinally of the casing, and to unlocking position by movement of the cap in the opposite direction.

17. In a cartridge fuse, a tubular casing, a terminal blade projecting from an end thereof, a cap comprising a collar detachably engageable over said casing end and a closure member seated within the collar and apertured to receive said blade therethrough, and clamping means permanently and rotatably connected to said closure member for interlocking with said blade to hold the same against movement relative to the casing.

18. In a cartridge fuse, an insulating casing, a collar detachably threaded over one end thereof, a closure member engaged between the collar and the end of the casing, a terminal blade projecting through said casing end and closure member, and clamping means connected with said closure member and shiftable thereon to interlock with said blade and hold the same against movement axially of said casing.

19. In a cartridge fuse, a casing, and end cap attachable thereto by spiral movement relative to the casing, a fuse terminal blade projecting through an end of said casing and the cap, and means operated by frictional engagement with said cap during spiral movement thereof, to interlock said cap and blade against relative movement therebetween axially of the cap.

20. An end cap for fuse casings, including a casing attachable portion, and a fuse terminal interlockingly engageable member permanently connected thereto and movable thereon into clamping engagement with a fuse terminal.

21. An end cap for fuse casings, including a casing attachable portion, a fuse terminal blade lock member in swivelled connection therewith, a closure member permanently and shiftably connected to said lock member, said lock member and closure member having apertures therein to receive a terminal blade therethrough when in registry, and means on said cap frictionally engageable with said lock member to shift the same on the closure member.

22. A two-part enclosed refillable blade fuse; one part comprising fuse link connected terminal blades having casing end closure means permanently secured to one blade against movement longitudinally thereof; and the other part comprising a casing capped at one end, into which said first part is insertable through the opposite end, and carrying means manually operable to releasably clamp said parts against longitudinal movement relative to each other.

23. A refillable blade fuse comprising in combination, a casing, a fuse strip assembly therein and having blade terminals projecting from each end of the casing, means for closing each end of the casing, and means movable circumferentially of the casing and arranged for positive cooperative interlocking engagement with a blade terminal for clamping same against movement longitudinally of the casing.

24. A fuse end assembly comprising in combination with a fuse casing, an end closure member adapted to seat over the casing end, a lock member arranged for interlocking engagement with a terminal blade, and an end cap arranged to be screwed on the casing end to clamp the lock member to the closure member and the closure member to the casing end, all of said cap, lock member and closure member being relatively rotatable prior to clamping pressure of the cap thereon.

25. In a fuse, a casing, an end cap, a terminal member, a lock means interengageable with the terminal member to prevent movement thereof axially of the casing, said lock means being operable by movement of the cap.

26. In a fuse, a casing, an end cap, a terminal member, and lock means interengageable with said terminal member to prevent movement thereof axially of the casing, said lock means being movable relative to the cap and being actuated thereby.

27. In a fuse having a casing and a terminal member; a closure member for an end of the casing, means for clamping said closure member thereagainst, and lock means interengageable with the terminal member to prevent movement thereof axially of the casing; all of said closure member, clamping means and lock means being movable axially of the casing along the terminal member and being relatively movable in a direction other than axially of the casing while associated with the terminal member.

28. In a fuse, a casing, a terminal member, means for closing an end of the casing about said terminal member, means for clamping said closure means in service position, and lock means interlockingly engageable with said terminal member to prevent movement of the terminal member axially of the casing, said lock means being disposed for operating movement between said closure means and clamping means.

29. A fuse casing end closure comprising, a member adapted to seat on and cover a casing end, and fuse terminal interlockingly engageable means coupled to said member and movable thereon into clamping engagement with a fuse terminal.

30. A fuse casing end closure comprising, a plate adapted to seat on and cover a casing end, a member adapted to clampingly interlock with a fuse terminal, and means coupling said plate and member in shiftable relation relative to each other.

31. A fuse casing end closure comprising, a plate adapted to seat on and cover a casing end, and a member slidable on said plate to interlock with a fuse terminal, said member having a portion thereof formed as a cam.

32. In a fuse including a casing and a terminal blade having a flange member; a closure member adapted to seat on the casing end, and a clamp member movable on said closure member to interlock with the terminal blade; one of said members having a cam portion whereby as the clamp member is actuated said closure member is clamped against the terminal blade flange.

33. In a cartridge fuse, a casing, a closure member upon an end thereof, a collar having detachable engagement with the casing end over the closure member, a terminal blade projecting through said closure member and collar, and means disposed between the collar and the closure member for interlockingly engaging the terminal blade.

34. In a fuse, a casing, a removable end cap, a terminal member, and lock means interengageable with the terminal member to prevent movement thereof axially of the casing, said lock means being operable by movement of the cap.

35. A fuse casing end closure comprising, a member adapted to seat on and cover a casing end, fuse terminal interlockingly engageable means coupled to said member and movable thereon, and a removable collar engaging the casing end over the member and terminal engageable means.

36. A fuse casing end closure comprising, a plate adapted to seat on and cover a casing end, a member adapted to interlock with a fuse terminal, means coupling said plate and member in shiftable relation relative to each other, and a removable collar engaging the casing end over the member and terminal engageable means.

37. A fuse casing end closure comprising, a plate adapted to seat on and cover a casing end, a member slidable on said plate to interlock with a fuse terminal, said member having a portion thereof formed as a cam, and a removable collar engaging the casing end over the member and terminal engageable means.

JOHN H. HICKEY.